United States Patent [19]
Valkanas

[11] Patent Number: 5,837,009
[45] Date of Patent: Nov. 17, 1998

[54] METHOD FOR THE PRODUCTION OF QUALITY COTTON YARNS INVOLVING A LOW-COST PROCESS, FREE OF ENVIRONMENTAL POLLUTION

[75] Inventor: George N. Valkanas, Marousi, Greece

[73] Assignee: Innoval Management Limited, Curacao, Netherlands Antilles

[21] Appl. No.: 676,210

[22] PCT Filed: Sep. 5, 1995

[86] PCT No.: PCT/GR95/00015

§ 371 Date: Jul. 19, 1996

§ 102(e) Date: Jul. 19, 1996

[87] PCT Pub. No.: WO96/07776

PCT Pub. Date: Mar. 14, 1996

[30] Foreign Application Priority Data

Sep. 6, 1994 [GR] Greece .................. 940100414

[51] Int. Cl.$^6$ .................. D01C 1/00; D06M 11/44
[52] U.S. Cl. .................. 8/125; 8/137; 8/139; 8/108.1; 8/111; 8/156; 8/157; 8/141; 57/1 R; 19/66 CC; 19/200; 19/201
[58] Field of Search .................. 8/125, 137, 139, 8/108.1, 111, 156, 157, 141; 57/1 R; 19/66 CC, 200, 201

[56] References Cited

U.S. PATENT DOCUMENTS 2,252,730  8/1941  Ridgway et al. .................. 8/139
2,970,882  2/1961  Kumin et al. .................. 8/125

FOREIGN PATENT DOCUMENTS

| 0434058 | 4/1939 | Belgium . |
| 434058  | 4/1939 | Belgium . |
| 0474895 | 9/1990 | European Pat. Off. . |
| 474895  | 3/1992 | European Pat. Off. . |

*Primary Examiner*—Alan Diamond
*Attorney, Agent, or Firm*—Birch, Stewart, Kolasch and Birch, LLP

[57] ABSTRACT

A method for cotton purification is described, where the cotton is subject to a purification process in water. The process solution contains calcium hydroxide and a non-ionic detergent wetting agent. Following this processing the cotton is rendered hydrophilic. The cotton is carried in a net with simultaneous removal of the adsorbed processing solution. It is then washed and bleached with $H_2O_2$ or ClONa in a two-stage process. The effluent water is processed by anaerobic digestion in the thermophilic region for the production of biogas. The effluent water from the anaerobic digestion process is further processed by aerobic biological treatment. The whole process operates with energy self-sufficiency without resulting in environment pollution. Finally, a high purity cotton is produced with high water absorptivity which is suitable for spinning for the production of quality cotton yarns suitable for weaving quality fabrics or dyeing.

11 Claims, No Drawings

METHOD FOR THE PRODUCTION OF QUALITY COTTON YARNS INVOLVING A LOW-COST PROCESS, FREE OF ENVIRONMENTAL POLLUTION

This application is a 371 of PCT/GR95/00015 filed Sep. 5, 1995.

This invention refers to an original method for the processing of cotton yarns: By this method, the traditional mechanical spinning process is substituted by a wet process which involves complete purification of the cotton by rendering it hydrophilic. This process is self-sufficient in terms of energy consumption and does not lead to environmental pollution.

The textiles industry is a field of technical and industrial activity since the Renaissance period. The first industrial installations and specialised industrial equipment have been developed for textiles processing. The textiles industry consumes mainly cotton, which is not being produced in Central Europe, where industrial equipment and installations were first developed. Hence, large capital intensive developments were necessary in the cotton-producing countries for the exploitation of the said raw material. Greece is among the cotton producers, indeed the major European producer. Among the European Union countries, Greece is the country most depending on the cotton and yarn manufacturing industry, an industry requiring highly expensive industrial installations, often becoming problematic and economically unsound. With a production of 700,000 tons/year the problems in the industrial exploitation of this industrial agricultural product may reflect badly on the overall economic performance of the Country.

The exploitation of cotton for yarn production is developed along the following series of processes:

a) Mechanical purification and arrangement of yarns, where in more than 10 different equipment of a high capital and operating cost are used.

b) Chemical purification by mercerising and scouring, where highly expensive installations are used, and where an alkaline effluent, difficult to handle, is released.

c) Yarn dyeing, where large volumes of water are consumed, and where coloured effluents are released.

Thus, the cotton yarn production and the cotton fabric production involve complex processes involving high production costs, a high consumption of water and the release of toxic and other harmful pollutants.

The inventor has been intensively involved in Research and Development work aiming at the reduction of production costs and of water consumption and at the elimination of environmental pollution, for the reduction of the overall cost of yarn and fabric production from cotton.

It was observed that the utilization of devices for cotton accommodation by lap and yarn formation is not possible, as wet processes follow the yarn production process.

It was also observed that cotton can be directly introduced into a wet process, as its presence in an aqueous environment will induce fibre orientation. Should this be combined with cotton purification by rendering it hydrophilic to some desirable extent, the process will be complete and cotton will assume a form convenient for spinning, which will not be prone to agglomeration.

It was also observed that this production process leads to yarn and fabric production at a reduced cost, involving a smaller water consumption and the elimination of environmental pollution problems. This production process will also lead to higher quality—lower coast cotton yarn and fabrics.

This invention refers to and describes a method for yarn and fabric production featuring the above advantages leading to cotton yarn production (and subsequently cotton fabric production) in an overall production process free of environmental pollution, which involves generation of heat in the form of biogas produced by the anaerobic digestion in the thermophilic region of the waste material and refuse produced. Thus, this production process constitutes a clean production technology which is self-sufficient in terms of its energy requirements.

According to this invention, the cotton which is received in packages is passed to a tank filled with water containing calcium hydroxide at a ratio of 2–4% by weight of cotton. It also contains non-ionic detergent at a quantity of 2–5 gr./liter of process water. The cotton is suspended in excess water in the order 1–10 or 1–20 weight/volume. The cotton is carried in a polypropylene net and heated to a temperature of 60° to 150° C., (preferably 60°–80° C.) with raw heating steam and being continuously agitated for a time period of 1–3 hours. Following its heating, it is lifted by a crane and is carried to a unit comprising of a series of horizontal presses where it is compressed to 20 atm. with simultaneous water removal. The compressed cotton is washed in water which originates from the decoloration unit downstream and is then conveyed to the decoloration unit, where it is bleached in the presence of 10% ClONa, or 10% hydrogen peroxide or 5% ozone solution. Following a two-stage processing, the cotton is received at a high degree of whiteness, in the order of 85–90 degrees lovipont. The effluent water from the bleaching process is used for washing the cotton in the presses.

Thus a high purity cotton of 80–90 degrees lovipont and of controlled hydrophilic properties (absorptivity of 5–20 gr. water/gr. cotton) is produced, featuring a water absorption rate of 0.5–1.5 gr. water/gr. cotton/minute. The hydrophilic nature of the final product depends on the duration and conditions of processing with calcium and detergent. The results of this process are summarised in Tables 1 and 2.

TABLE 1

Processing Conditions

| | Ca (OH)2 gr./% | Levapon gr./lit | Temperature °C. | Time mins |
|---|---|---|---|---|
| 1 | 0.00 | 0.4 | 75 | 120 |
| 2 | 0.00 | 3.8 | 75 | 120 |
| 3 | 4.00 | 0.4 | 75 | 120 |
| 4 | 4.00 | 0.8 | 75 | 120 |
| 5 | 4.00 | 1.1 | 75 | 120 |
| 6 | 4.00 | 1.6 | 75 | 120 |
| 7 | 4.00 | 2.5 | 75 | 120 |
| 8 | 4.00 | 3.8 | 75 | 120 |
| 9 | 4.00 | 0.4 | 60 | 120 |
| 10 | 4.00 | 2.5 | 60 | 120 |
| 11 | 4.00 | 2.5 | 60 | 360 |
| 12 | 4.00 | 0.4 | 75 | 360 |
| 13 | 4.00 | 3.8 | 75 | 360 |
| 14 | 4.00 | 0.4 | 135 | 360 |
| 15 | 4.00 | 3.8 | 135 | 360 |
| 16 | 2.00 | 2.1 | 60 | 240 |
| 17 | 2.00 | 2.1 | 105 | 240 |
| 18 | 2.00 | 2.1 | 105 | 240 |
| 19 | 2.00 | 2.1 | 75 | 240 |
| 20 | 2.00 | 2.1 | 105 | 120 |

TABLE 2

Results

| | Hydrophilic properties | Absorption Ratio | Yield % |
|---|---|---|---|
| 1 | 6.53 | 0.02 | 99.3 |
| 2 | 8.10 | 0.20 | 86.4 |
| 3 | 10.48 | 0.55 | 87.8 |
| 4 | 13.5 | 0.6 | 86.6 |
| 5 | 15.5 | 0.72 | 85.8 |
| 6 | 17.5 | 0.81 | 85.2 |
| 7 | 19.5 | 0.9 | 84.8 |
| 8 | 17.32 | 0.94 | 85.2 |
| 9 | 13.20 | 1.08 | 87.3 |
| 10 | 18.14 | 1.12 | 84.2 |
| 11 | 16.31 | 1.29 | 83.3 |
| 12 | 11.26 | 0.7 | 85.5 |
| 13 | 12.00 | 1.8 | 84.8 |
| 14 | 10.05 | 0.71 | 85.7 |
| 15 | 17.84 | 1.71 | 83.7 |
| 16 | 17.20 | 1.45 | 87.4 |
| 17 | 17.99 | 0.96 | 86.8 |
| 19 | 17.53 | 0.91 | 87.1 |
| 19 | 17.28 | 0.98 | 86.3 |
| 20 | 17.84 | 0.91 | 84.11 |

From the results of the above Tables it is shown that the principal parameters of cotton purification and of rendering the material hydrophilic is the quantities of detergent and calcium hydroxide added. Raising the temperature has a small effect on the technological characteristics of the product and leads to a decrease of the yield. The detergent particularly, is of a non ionic nature (Levapon was found to be the most suitable material as it has a high activity). Calcium addition is also important. Optimum conditions hence are: a temperature in the order of 60°–80° C., a ratio of cotton to process water in the order of 1/15 to 1/20, an addition of calcium hydroxide at a ratio of 2–4% w/w and of Levapon at a ratio of 0.2–4 gr./lt. of process solution.

Then, the cotton is dried by conventional methods, i.e. in drying towers with rising hot air, whereas the cotton is mercerised to the desired degree of purification. It is then subject to spinning processes resulting in higher quality yarns for dyeing or weaving.

The process and cleaning water streams which carry chemicals and heat, as well as the resulting solid waste stream, are continuously recycled with a substitution of 10–20% of the quantity of the process water. The waste stream removed has a constant BOD load of 20,000–40,000 and COD of 50,000–100,000. It is passed to the installations for anaerobic digestion which operate in the thermophilic region in a BIOMET PROCESS unit (invented and demonstrated by the inventor) with a yield in biogas (containing methane in the order of 85%) of 0.5 cu.meters/kg of organic matter degraded. The effluent water produced, following the anaerobic digestion, can be used as process water and is finally subject to aerobic biological treatment to effluent water of BOD 100.

The above method constitutes an original approach towards cotton processing for yarn production, introducing an innovation both in terms of the process used and of the results obtained. It offers innovative operation, it constitutes a clean technology and it operates with energy self-sufficiency without causing environmental pollution.

In general the invention introduces maximum economy in the processing of cotton for yarn production, reducing the cost of installations, as the cotton can be sorted in terms of quality and length of fibre and as it will be subject to a simple treatment which will not lead to the reduction of the strength of the cellulosic mass. The cotton will be delivered at an advanced degree of processing Finally, following treatment by the method proposed by this invention, high quality yarns will be produced, as the cotton will have been purified and rendered hydrophilic, according to the exploitation requirements. This process results in a high quality product and substitutes the mercerising process. All these quality and economy—related features are combined with the need for simple and low-cost installations operating free of environmental pollution.

EXAMPLE No 1

10 kg of cotton carried in a polypropylene net are brought into a 1 cu.m. capacity tank containing 200 lt. of water, 0.4 kg calcium hydroxide and 2.5 gr./lt. Levapon. The contents of the tank are heated to a temperature of 75° C. Heating with continuous agitation of cotton lasts for three hours. Then, the net is lifted by a crane and passed to a horizontal press where it is compressed by the application of a pressure of 20 atm. with simultaneous water removal. The resulting cotton product contains moisture at 20%. It is then washed with water from the bleaching process and then transferred, always in the net, to a decolorisation unit containing a 20% $H_2O_2$ or a 20% ClONa solution. It is then subject to two-stage bleaching at installations similar to those for bleaching paper-pulp. Finally, a degree of bleaching (whitening) of 86 degrees lovipont is achieved with a yield of 86.4%. The product did not show any difference in its mechanical properties, it has hydrophilic properties expressed as absoptivity of 17.10 gr. water/gr. cotton and a rate of water absorption of 0.81 gr. water/gr. cotton/minute.

The process water was recycled by substituting 20% of it by fresh processing solution. The pollutant load was stabilised at 22,000 BOD and 48,000 COD. Thus, the steady state consumption of chemicals can be reduced to 20% of the chemicals originally present in the tank per unit cotton produced, i.e. 0.8 kg calcium hydroxide/100 kg cotton and 0.5 gr. detergent/lt. water.

EXAMPLE No 2

10 kg of cotton carried in a polypropylene net are brought into a tank containing 150 lt. of water, calcium hydroxide at a ratio of 2% by weight of cotton and 2.1 gr. of Levapon/liter of solution. The contents of the tank are heated by raw steam to a temperature of 60° C. for three hours. The material is then compressed and bleached as in Example No 1. The product did not show any difference in its mechanical properties, it has hydrophilic properties expressed as an absortivity of 18.280 gr. water/gr. cotton and a rate of water absorption of 0.98 gr. water/gr. cotton/minute. The process water was recycled by substituting 20% of it by fresh processing solution. Thus, actual chemicals consumption is 0.4 kg calcium hydroxide/100 kg cotton and 0.41 gr. Levapon/lt. water.

EXAMPLE No 3

In an enclosure of a capacity of 1 cubic meters 20 kg of cotton in a polypropylene net and 300 lit. of water containing 0.8 kg calcium hydroxide and 2.5 gr. Levapon/liter are placed. The total enclosure is heated at 135° C. for two hours. The cotton is removed and compressed in a horizontal press by the exertion of a pressure of 20 atm., reaching a moisture content of 20%. It is then washed and bleached in a two-stage process as per the Examples No 1 and 2. The following product is finally collected:

Experiment a:

Yield 85.7%; hydrophilic properties expressed as an absorptivity of 15.04 gr. water/gr. cotton; rate of water absorption 0.71 gr. water/gr. cotton/minute Experiment b:

Yield 85.2%; hydrophilic properties expressed as an absortivity of 15.82 gr. water/gr. cotton; rate of water absorption 0.82 gr. water/gr. cotton/minute The process water was recycled by substituting 20% of it by fresh processing solution. Thus, actual chemicals consumption is 0.8 kg calcium hydroxide/100 kg cotton and 0.5 gr. Levapon/lt. water.

EXAMPLE No 4

In an enclosure of a capacity of 0.5 cubic meter, 15 kg of cotton in a polypropylene net and 300 lit. water containing 0.3 kg calcium hydroxide and 2.1 gr. Levapon/liter are placed. The total enclosure is heated at 105° C. for four hours. Following the cleaning and bleaching processes explained in examples 1–3, the cotton is received at a yield of 86.8% and has the following properties: hydrophilic properties expressed as an absortivity of 17.99 gr. water/gr. cotton; rate of water absorption 0.96 gr. water/gr. cotton/minute EXAMPLE No 5

The effluent water replaced by fresh processing solution has an environmental load of 30,000 BOD and 50,000 COD. It is fed to an installation of anaerobic digestion, operating in the thermophilic region and producing 0.47 kg of biogas (containing 85% methane)/COD reduced. This is equivalent to a degree of pollution reduction of 85–88%. Part of the effluent water stream from the anaerobic digestion treatment is recycled into the process water, the rest being further processed at aerobic biological treatment installations for the production of water stream of BOD 100 which can be safely rejected to the environment.

The biogas produced is used for the production of the steam used for the processing of cotton. Indeed, in the same as for the process water which is recycled to a degree of 60–80%, the energy requirements for heating the cotton are also reduced. 60–70% of the biogas produced can be used for electricity generation for the needs of the plant. This will depend on the size and the design of the plant.

I claim:

1. A method for spinning cotton, comprising the steps of:

passing cotton into a processing solution of calcium hydroxide which is at a concentration of 2–4% by weight of calcium to cotton, and a non-ionic detergent which is at a concentration of 0.4–4 grams/liter, wherein the concentration of cotton in the solution is 10–20 volumes of water per weight of cotton, heating the solution with agitation at a temperature of 60° to 150° C., for 1–3 hours, transporting the cotton to a press, removing water from the cotton by pressure, bleaching the cotton in the presence of a solution of 10% ClONa or 10% hydrogen peroxide, washing the cotton in water, drying the cotton, and spinning the cotton that is produced into a yarn.

2. The method of claim 1, whereby the produced cotton has a water absorptivity of 5–20 grams water/gram cotton.

3. The method of claim 1, wherein the produced cotton has a water absorption rate of 0.3–1.4 gram water/gram cotton/minute.

4. The method of claim 1, wherein 20–40% of the original processing solution is substituted with recycled fresh solution.

5. The method of claim 4, wherein the substituted solution is anaerobically digested, and a biogas is released at a rate of 0.45–5 kg/kg COD reduced.

6. The method of claim 1, wherein the cotton is enclosed in a polypropylene net.

7. The method of claim 1, wherein said pressure to remove water is 20 atm.

8. The method of claim 1, wherein said temperature is 60°–80° C.

9. The method of claim 1, wherein the cotton after the washing step has a lovipont grade of 85–90.

10. A cotton product produced by the method of claim 1, which has a water absorptivity of 5–20 grams water/gram cotton.

11. A cotton product produced by the method of claim 1, which has a water absorption rate of 0.3 to 1.4 gram water/gram cotton/minute.

* * * * *